(12) United States Patent
Shea et al.

(10) Patent No.: US 11,816,639 B2
(45) Date of Patent: Nov. 14, 2023

(54) PROVIDING AN INTERFACE FOR INTERVIEW SESSIONS

(71) Applicant: Capital One Services, LLC, McLean, VA (US)

(72) Inventors: Jonathan T Shea, Ashland, VA (US); Steven Coulbourne, Haymarket, VA (US); Jamie Taylor, Chesterfield, VA (US); Abigail Greene, San Francisco, CA (US); Deepak Shanmukha Rama, Sunnyvale, CA (US); Krishna Bogavelli, Herndon, VA (US); Elizabeth Ashley Binns, Richmond, VA (US); William Giles, Rhome, TX (US)

(73) Assignee: Capital One Services, LLC, McLean, VA (US)

( * ) Notice: Subject to any disclaimer, the term of this patent is extended or adjusted under 35 U.S.C. 154(b) by 85 days.

(21) Appl. No.: 17/443,919

(22) Filed: Jul. 28, 2021

(65) Prior Publication Data
US 2023/0033257 A1  Feb. 2, 2023

(51) Int. Cl.
*G06Q 10/1093* (2023.01)
*G06Q 10/1053* (2023.01)
*H04L 65/401* (2022.01)
*H04L 65/403* (2022.01)

(52) U.S. Cl.
CPC ..... *G06Q 10/1093* (2013.01); *G06Q 10/1053* (2013.01); *H04L 65/403* (2013.01); *H04L 65/4015* (2013.01)

(58) Field of Classification Search
CPC .......... G06Q 10/10; G06Q 10/063112; G06Q 10/1053; H04L 65/403; H04L 12/1822
See application file for complete search history.

(56) References Cited

U.S. PATENT DOCUMENTS

| 6,701,322 B1* | 3/2004 | Green | G06Q 30/02 707/999.102 |
| 2003/0037032 A1* | 2/2003 | Neece | G06Q 30/02 |
| 2005/0257235 A1* | 11/2005 | Lin | G06Q 10/00 725/1 |

(Continued)

FOREIGN PATENT DOCUMENTS

| WO | WO-2012061837 A1 * | 5/2012 | G06Q 30/0203 |
| WO | WO-2021202010 A1 * | 10/2021 | G06Q 10/1053 |

*Primary Examiner* — Johnna R Loftis
(74) *Attorney, Agent, or Firm* — Harrity & Harrity, LLP

(57) ABSTRACT

In some implementations, a system may establish an interview session between a first client device associated with an interviewer and a second client device associated with a candidate. The system may transmit, to the first client device associated with the interviewer, a first user interface during the interview session between the first client device and the second client device. The system may transmit, to the second client device associated with the candidate, a second user interface during the interview session between the first client device and the second client device. The system may receive, from the first client device, the feedback associated with the interview session. The system may transmit, to a human resource system, the feedback to enable a hiring recommendation regarding whether to offer the position associated with the interview session to the candidate.

20 Claims, 14 Drawing Sheets

(56) References Cited

U.S. PATENT DOCUMENTS

| | | | |
|---|---|---|---|
| 2009/0228323 A1* | 9/2009 | Ebrahimian | G06Q 10/1053 |
| | | | 715/753 |
| 2010/0161503 A1* | 6/2010 | Foster | G06Q 10/1053 |
| | | | 705/321 |
| 2013/0097093 A1* | 4/2013 | Kolber | G06Q 10/1053 |
| | | | 705/321 |
| 2014/0156550 A1* | 6/2014 | Olivier | G06Q 10/1053 |
| | | | 705/321 |
| 2014/0279033 A1* | 9/2014 | Mullor | G06Q 30/0203 |
| | | | 705/14.64 |
| 2016/0028736 A1* | 1/2016 | Gehring | H04W 12/08 |
| | | | 726/4 |
| 2016/0028848 A1* | 1/2016 | Gehring | H04L 67/143 |
| | | | 709/213 |
| 2019/0164107 A1* | 5/2019 | Upadhyay | G06Q 10/06398 |
| 2019/0348063 A1* | 11/2019 | Vaculin | G06V 40/174 |
| 2021/0158302 A1* | 5/2021 | Dangi | G06Q 10/1053 |
| 2022/0198397 A1* | 6/2022 | Lavoignet | H04N 7/144 |

* cited by examiner

PROVIDING AN INTERFACE FOR INTERVIEW SESSIONS

BACKGROUND

Interview software may allow organizations to remotely conduct video interviews with candidates and/or facilitate a setup of in-person interviews. Interview software may allow interviewers to conduct video interviews in real-time with candidates. Interview software may be used by human resource managers, recruiters, and/or other employees during an interview process to conduct video interviews with candidates and/or to set up in-person interviews.

SUMMARY

In some implementations, a system for providing an interface for interview sessions includes one or more memories and one or more processors, communicatively coupled to the one or more memories, configured to: receive, from an interview scheduling system, an indication of an interview session scheduled between an interviewer and a candidate, wherein the interview session is scheduled based on an interviewer profile associated with the interviewer indicating that the interviewer is certified to conduct a type of interview associated with the interview session; establish the interview session between a first client device associated with the interviewer and a second client device associated with the candidate, wherein the interview session is an electronic session established between the first client device and the second client device for conducting an interview between the interviewer and the candidate; receive, from a content management system, interview content associated with the interview session, wherein the interview content includes interview questions and scenarios and is based on a position associated with the interview session; transmit, to the first client device associated with the interviewer, a first user interface during the interview session between the first client device and the second client device, wherein the first user interface provides a video stream of the candidate, a chat box for messaging between the interviewer and the candidate, and a window for displaying the interview content and capturing feedback associated with the interview; transmit, to the second client device associated with the candidate, a second user interface during the interview session between the first client device and the second client device, wherein the second user interface provides a video stream of the interviewer, the chat box for messaging between the interviewer and the candidate, and a window for displaying the interview content; receive, from the first client device, the feedback associated with the interview session; and transmit, to a human resource system, the feedback associated with the interview session to enable a hiring recommendation regarding whether to offer the position associated with the interview session to the candidate.

In some implementations, a method of providing an interface for interview sessions includes establishing an interview session between a first client device associated with an interviewer and a second client device associated with a candidate, wherein the interview session is established based on an indication received from an interview scheduling system, and wherein the interview session is scheduled based on an interviewer profile associated with the interviewer indicating that the interviewer is certified to conduct a type of interview associated with the interview session; transmitting, to the first client device associated with the interviewer, a first user interface during the interview session between the first client device and the second client device, wherein the first user interface provides a video stream of the candidate, a chat box for messaging between the interviewer and the candidate, and a window for displaying interview content and capturing feedback associated with the interview; transmitting, to the second client device associated with the candidate, a second user interface during the interview session between the first client device and the second client device, wherein the second user interface provides a video stream of the interviewer, the chat box for messaging between the interviewer and the candidate, and a window for displaying the interview content; receiving, from the first client device, the feedback associated with the interview session; aggregating, to form aggregated feedback, the feedback with additional feedback received from additional client devices associated with additional interviewers, wherein the additional feedback is associated with additional interview sessions conducted by the additional interviewers with the candidate for a same position; and transmitting, to a human resource system, the aggregated feedback to enable a hiring recommendation regarding whether to offer the position associated with the interview session to the candidate.

In some implementations, a non-transitory computer-readable medium storing a set of instructions includes one or more instructions that, when executed by one or more processors of a device, cause the device to: receive, from an interview scheduling system, an indication of an interview session scheduled between an interviewer and a candidate, wherein the interview session is scheduled based on an interviewer profile associated with the interviewer indicating that the interviewer is certified to conduct a type of interview associated with the interview session; establish the interview session between a first client device associated with the interviewer and a second client device associated with the candidate; receive, from a content management system, interview content associated with the interview session, wherein the interview content includes interview questions and scenarios and is based on a position associated with the interview session; transmit, to the first client device associated with the interviewer, a first user interface during the interview session between the first client device and the second client device, wherein the first user interface provides a video stream of the candidate, a chat box for messaging between the interviewer and the candidate, and a window for displaying the interview content and capturing feedback associated with the interview session; and transmit, to the second client device associated with the candidate, a second user interface during the interview session between the first client device and the second client device, wherein the second user interface provides a video stream of the interviewer, the chat box for messaging between the interviewer and the candidate, and a window for displaying the interview content.

DETAILED DESCRIPTION

Figure 1A:
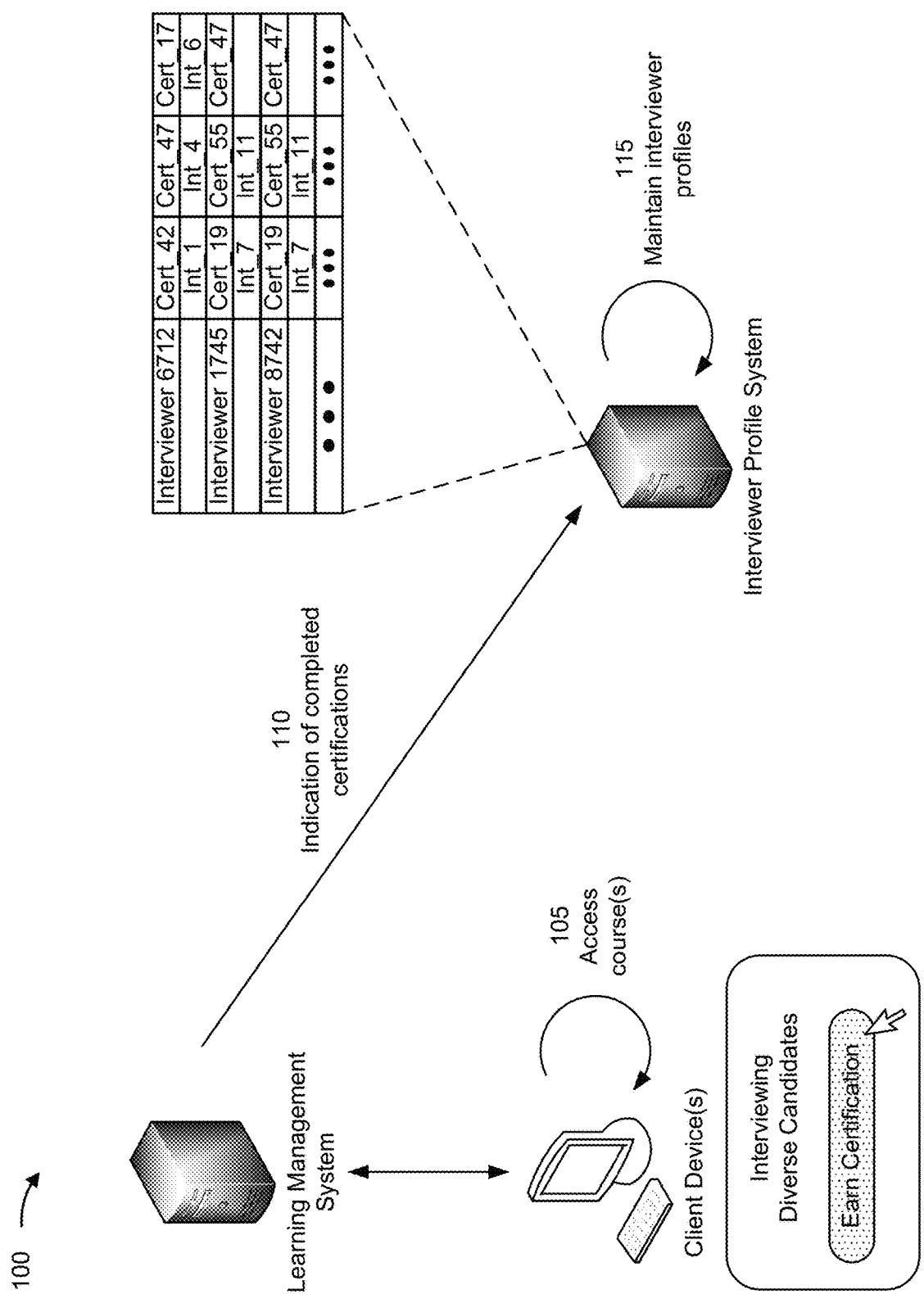
FIGS. 1A-1K are diagrams of an example implementation relating to providing an interface for interview sessions.

The following detailed description of example implementations refers to the accompanying drawings. The same reference numbers in different drawings may identify the same or similar elements.

Organizations often conduct numerous interviews with candidates in a given year. An interview process for the candidates and/or the organizations may involve building and maintaining talent pipelines of suitable candidates, engaging potential candidates via events, posting available positions and accepting applications for those positions, initiating interviews, scheduling interviews, signing up interviewers to conduct the interviews, confirming the interviews, preparing the interviewers, facilitating the interviews, submitting feedback for the interviews, performing a consensus management (e.g., determining to extend offers to certain candidates), recording candidate decisions, and/or performing hiring logistics related to hiring candidates. A number of steps involved in the interview process may involve manual processes, which may be burdensome to both the candidates and for human resource managers and recruiters associated with the organizations. For example, the interview process may involve various manual processes such as scheduling interviews, identifying interviewers to conduct the interviewers, and so on. Such processes may be inefficient and may lead to inconsistencies when interviewing the candidates in terms of questioning during the interviews, aptitudes of the interviewers conducting the interviews, certifications associated with the interviewers conducting the interviews, and so on.

In some implementations described herein, to solve the problems described above, as well as a related technical problem of how to create an interview management system that schedules interview sessions between candidates and interviewers that are certified to conduct the interview sessions, and where the interview management system provides a user interface for conducting the interview sessions, a technical solution is described herein for creating an interview management system that receives a request to set up an interview session with a candidate and selects an interviewer to conduct the interview session. The interview management system may select the interviewer based on a validation that the interviewer is certified to conduct a type of interview associated with the interview session. The interview management system may establish the interview session between a first client device associated with the interviewer and a second client device associated with the candidate. The interview session may be an electronic session established between the first client device and the second client device for conducting an interview between the interviewer and the candidate. The interview session may be a video session, an audio session, and/or a text based session. The interview management system may transmit, to the first client device, a first user interface that is configured for the interviewer. The first user interface may provide a window for displaying interview content and capturing feedback associated with the interview. The interview content may include interview questions and scenarios and may be based on a position associated with the interview session. The interview management system may transmit, to the second client device, a second user interface that is configured for the candidate. The second user interface may provide a window for displaying the interview content. The interview management system may receive, from the first client device, feedback associated with the interview session. The feedback may involve a rating of the candidate, comments regarding the candidate's performance during the interview, and so on. The interview management system may provide a recommendation regarding whether to offer the position associated with the interview session to the candidate based on the feedback.

In some implementations, the interview management system may ensure that the interviewers are validated according to interviewer profiles associated with the interviewers. An interviewer profile may indicate certifications that an interviewer associated with the interviewer profile has earned. The interviewer profile may indicate types of interviews that the interviewer is trained to conduct. As a result, the interview management system may ensure that interviewers assigned to specific interviews are capable of conducting those interviews.

In some implementations, the interview management system may ensure that the interview content received for the interview session is from a centralized content management source. Interview content may be centrally maintained for a plurality of interview types, and based on a certain type of interview that is being conducted, corresponding interview content may be presented to the first and second client devices. As a result, the interview management system may ensure that the interview content is consistent across interview sessions that are conducted with a plurality of candidates for a same position, thereby not giving any one candidate an advantage or a disadvantage in terms of difficulty of questions and/or scenarios presented during the interview session.

In some implementations, the interview management system, that receives the request to set up the interview session with the candidate, selects the interviewer to conduct the interview session based on the validation that the interviewer is certified to conduct the type of interview associated with the interview session, may streamline and simplify the hiring process, which may be especially helpful with organizations that interview a relatively large number of candidates every year. The interview management system may reduce manual hours spent selecting interviewers and verifying that the interviewers are capable of conducting certain types of interviews, searching for interview content for a given type of interview, and so on. The interview management system may reduce organizational costs, reduce errors prone to occur during the interview process, and optimize organizational outcomes. The interview management system may improve interview experiences for both the candidates and the organizations. In addition to time and labor saved, errors in matching interviewers to candidates and/or subject matters and/or errors resulting from wrong questions posed during interview sessions may be reduced, and correcting such errors may involve using computer resources.

The interview management system may reduce labor content per candidate, increase candidate throughput per coordinator, increase interview logistics capacity per season, and reduce interview logistics labor spending. The interview management system may provide various benefits for recruiters, interviewers, and/or candidates. The interview management system may reduce interview logics labor cost and lower labor content per candidate. Reduced interview logistics labor cost may be associated with a cost per hire metric, and lower labor content per candidate may be associated with a time to fill metric and a cost of vacancy metric. A reduced candidate time for the interview process may lead to improved candidate satisfaction, which may be associated with a candidate satisfaction metric. Fewer local tools and processes may lead to a reduction in error rate, which may be associated with a metric involving a number of risk incidents. Increased data access may result in improved reporting and analytics, which may impact interviewer participation, interviewer recognition, and room utilization.

FIGS. 1A-1K are diagrams of an example implementation 100 related to providing an interface for interview sessions. As shown in FIGS. 1A-1K, example implementation 100 includes client device(s), a learning management system, an interviewer profile system, a human resource system, an interviewer scheduling system, an interviewer facilitation system, and a learning management system. These devices are described in more detail in connection with FIGS. 2 and 3.

In some implementations, an interview management system may include the learning management system, the interviewer profile system, the human resource system, the interviewer scheduling system, the interviewer facilitation system, and the learning management system.

As shown in FIG. 1A, and by reference number 105, a client device associated with an interviewer may access a course. The client device may access the course through a portal, which may be provided by a learning management system. The learning management system may maintain a plurality of courses related to interviewing. The courses may be associated with various aspects of interviewing, such as basic interviewing techniques, technology areas, communication skills, etc. The course may include instructional content, which may be video content, audio content, and/or text content. The course may include tests to measure a competency of the interviewer taking the course. After completing the course via the client device and/or passing tests to show competency, the interviewer may earn a certification. The certification may indicate that the interviewer has completed the course associated with the certification. The certification may validate that the interviewer is knowledgeable about the learning content associated with the course. The interviewer may be part of a pool of interviewers that are responsible for conducting interviews with candidates.

As an example, the client device may access a course on interviewing diverse candidates and avoiding micro aggressions during interviews. The client device may access a video with instructional content via the learning portal. The videos with the instructional content may be received from the learning management system. After the video is viewed, the course may involve a series of multiple choice questions. When a certain percentage of the multiple choice questions are answered correctly, the interviewer associated with the client device may earn a certification for completing the course. The client device may access various courses through the learning portal such that the interviewer may earn certifications for completing those courses. The interviewer may earn the certifications to show that the interviewer is qualified to conduct interviews with candidates.

As shown by reference number 110, the learning management system may transmit an indication of a completed certification to an interviewer profile system. The learning management system may determine that the interviewer has passed the course and earned the certification for completing the course. For example, the learning management system may determine that the interviewer has passed a test associated with the course, and as a result, the interviewer earned the certification for completing the course. The learning management system may transmit the indication of the completed certification after determining that the interviewer has passed the course and earned the certification.

As shown by reference number 115, the interviewer profile system may maintain interviewer profiles. An interviewer profile may indicate certifications earned by the interviewer. The certifications may be associated with courses that the interviewer has completed to show competency in subject matters associated with those courses. The interviewer profile may indicate types of interviews that the interviewer is allowed to conduct with candidates based on the certifications earned by the interviewer. For example, earning a particular certification or a combination of certifications may allow the interviewer to conduct a certain type of interview with candidates.

As an example, the interviewer profile system may maintain a database that stores the interviewer profiles. An interviewer profile may include an interviewer identifier associated with an interviewer and may correspond to a listing of certifications earned by the interviewer and/or a listing of types of interviews that the interviewer is allowed to conduct with candidates. In some cases, the interviewer profile may indicate positions for which the interviewer is able to conduct interviews.

In some implementations, the interviewer profile system may update the interview profiles as additional certifications are earned by interviewers. For example, when an interviewer completes an additional course and earns an additional certification, an interviewer profile associated with that interviewer may be updated to reflect the additional course and the additional certification. As another example, when a new interviewer is added to the pool of interviewers that are responsible for conducting interviews with candidates, a new entry may be added in the database that indicates an interviewer identifier associated with the newly added interviewer and courses completed by the newly added interviewer and/or certifications earned by the newly added interviewer. As a result, the interviewer profile system may maintain up-to-date certification information for the interviewers indicated in the database.

In some implementations, the interviewer profile system may maintain a set of rules that defines which types of interviews are allowed to be conducted based on certifications or combinations of certifications that are earned by interviewers. For example, the interviewer profile system may maintain a rule that defines that, for a first type of interview, certification X, certification Y, and certification Z are to be earned by an interviewer in order to conduct the first type of interview. At a later time, depending on updated organizational outcomes, the interviewer profile system may update the rule to define that, for the first type of interview, only certification X and certification Y are to be earned by an interviewer in order to conduct the first type of interview.

In some implementations, the interviewer profile system may provide centralized interviewer management with respect to tracking certifications and signing up interviewers to conduct interviews. The interviewer profile system may maintain a centralized database for interviewer information such as interviewer certifications. The interviewer profile system may provide management of interviewer pools and may automate participation tracking among the interviewers. The interviewer profile system may track diversity of interview panels. The interviewer profile system may enable supply management for interviewer capacity. The interviewer profile system may enable training and development of interviewers. As a result, candidates may be interviewed by interviewers that are qualified to be conducting interviews with the candidates.

In some implementations, the interviewer profile system may provide simplified and consistent interviewer management. The interviewer profile system may provide simplified interviewer population assignment, interviewer tracking, and/or interviewer training. The interviewer profile system may provide risk mitigation, as the interviewer profile system may provide documented and defensible eligibility criteria and certification processes. The interviewer profile system may enable interviewer and trainee tracking to be centralized. The interviewer profile system may store and display interview eligibility requirements. The interviewer profile system may provide online interviewer nomination. The interviewer profile system may calibrate interviewer progress tracking and approval. The interviewer profile system may provide interviewer calibration storage. The interviewer profile system may provide simplified and consistent list management.

In some implementations, the interviewer profile system may track interviewers to ensure a clear system of truth exists for personnel that should be interviewing and the types of interviews that those personnel should be giving to candidates. The interviewer profile system may provide interviewer supply reporting, as the interviewer profile system may provide insight into a holistic interviewer pool for an organization as a whole. The interviewer profile system may provide clear reporting on a number of certified interviewers and interviewers in training, which may be segmented by lines of business, by job family (e.g., types of positions), and/or by interviewing tool used for conducting interviews.

In some implementations, the interviewer profile system may provide information regarding interviewer gaps, interviewer fills, and interviewer participation. The interviewer profile system may provide an interviewer supply dashboard, which may provide a visual of interviewer supply and most popular certifications earned by interviewers. The interviewer profile system may provide information on interviewer supply and participation from a diversity perspective.

Figure 1B:
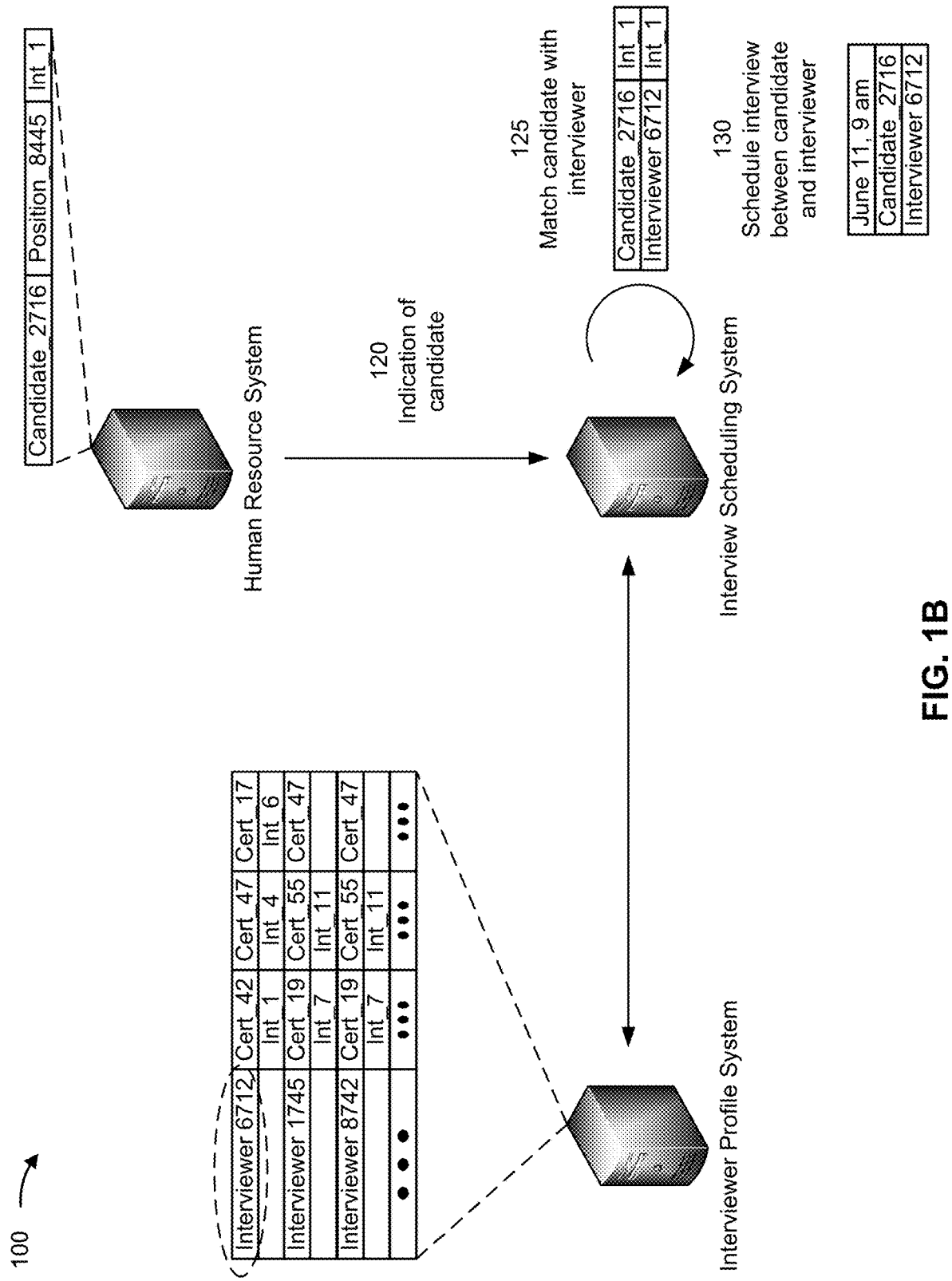

As shown in FIG. 1B, and by reference number 120, the human resource system may transmit an indication to the interview scheduling system that indicates a candidate that is applying for a position. The human resource system may indicate that the candidate is qualified to interview for the position and that the candidate should be scheduled for an interview. The human resource system may determine that the candidate is qualified to interview for the position based on resume information associated with the candidate, and/or an initial screening of the candidate. The indication may indicate a candidate name, a candidate identifier, and the position for which the candidate is applying, and/or a type of interview associated with the position for which the candidate is applying. As an example, the type of interview may refer to an informational interview, an individual interview, a group interview, a technical interview, a behavioral based interview, a task oriented interview, and so on.

As shown by reference number 125, the interview scheduling system may match the candidate with an interviewer. The interview scheduling system may select the interviewer to conduct the interview with the candidate. The interviewer scheduling system may access the interviewer profile system in order to match the candidate with the interviewer. For example, the interviewer scheduling system may transmit a search query to the interviewer profile system. The search query may indicate the position for which the candidate is applying, and/or the type of interview associated with the position for which the candidate is applying. The interviewer profile system may run the search query against the database that stores the interviewer profiles. The interviewer profile system may identify an interviewer, based on the interviewer profiles, that is able to conduct a type of interview that corresponds to the type of interview associated with the position for which the candidate is applying. The interviewer profile system may ensure that the interviewer is able to conduct interviews for the position for which the candidate is applying. The interviewer profile system may transmit a query response to the interview scheduling system. The query response may indicate the interviewer that is certificated to conduct the interview with the candidate. The query response may indicate the interviewer is able to conduct the type of interview associated with the position and the interviewer is able to conduct interviews for the position for which the candidate is applying. The interview scheduling system may match the candidate with the interviewer based on the search query and the query response communicated with the interviewer profile system.

In some implementations, the query response may indicate multiple interviewers that are certified to conduct the interview with the candidate. In this case, the interview scheduling system may select a subset of the multiple interviewers to conduct the interview. In other words, each of the multiple interviewers may potentially be selected to conduct the interview. Since each of the multiple interviewers have already been certified, any of these interviewers may be suitable to conduct the interview. The interview scheduling system may select the subset of the multiple interviewers randomly or in a fair distribution manner, based on an availability of each of the potential interviewers, or by using other selection criteria. For example, interviewers that are already scheduled to conduct interviews on a given day/week or interviewers that are not available to conduct interviews during a certain day/week may not be selected to conduct the interview.

As shown by reference number 130, the interview scheduling system may schedule the interview between the candidate and the interviewer. The interview scheduling system may schedule the interview based on an availability of the interviewer and/or a timeline for filling the position for which the candidate is applying. The interview scheduling system may access a calendar associated with the interviewer and select a day/time for the interview based on the interviewer's calendar.

In some implementations, the interview scheduling system may be responsible for candidate and interviewer scheduling of interviews. The interviewer scheduling system may communicate with a calendar server when performing the candidate and interviewer scheduling. The interview scheduling system may improve an efficiency of interview scheduling processes through automation. The interview scheduling system may be capable of scheduling both virtual interviews and in-person interviews.

In some implementations, the interview scheduling system may improve an efficiency of interview operations through automation of manual processes. The interview scheduling system may provide risk mitigation, as the interview scheduling system may reduce risk by standardizing selection panels and introducing controls. The interview scheduling system may collect, organize, and persist data to enable deep analytics and ad-hoc analysis. The interview scheduling system may provide interviewer solicitation and provide automated requests to interviewers to ask about interest in conducting interviews. The interview scheduling system may enable pre-planned and/or seasonal interviews by auto-creating interview schedules and events. The interview scheduling system may provide automated assignment of interviewers to events and/or automated creation of calendar invitations for attending interviews. The interview scheduling system may provide room reservations and/or live video interviewing details. The interview scheduling system may provide various types of reporting, such as interview volume reporting, interviewer participation tracking and reporting, and/or interviewer gap reporting. The interview scheduling system may provide automated electronic messages, alerts, and/or notifications regarding scheduled interviews. The interview scheduling system may provide integration with an electronic calendar, and may enable room reservations as well as creating, updating, and/or deleting calendar invitations associated with interviews. The interview scheduling system may provide various calendaring tools. The interview scheduling system may provide system controls, which may enable validation of interviewer certifications, standardization of interview slates, and validation against candidate statuses.

Figure 1C:
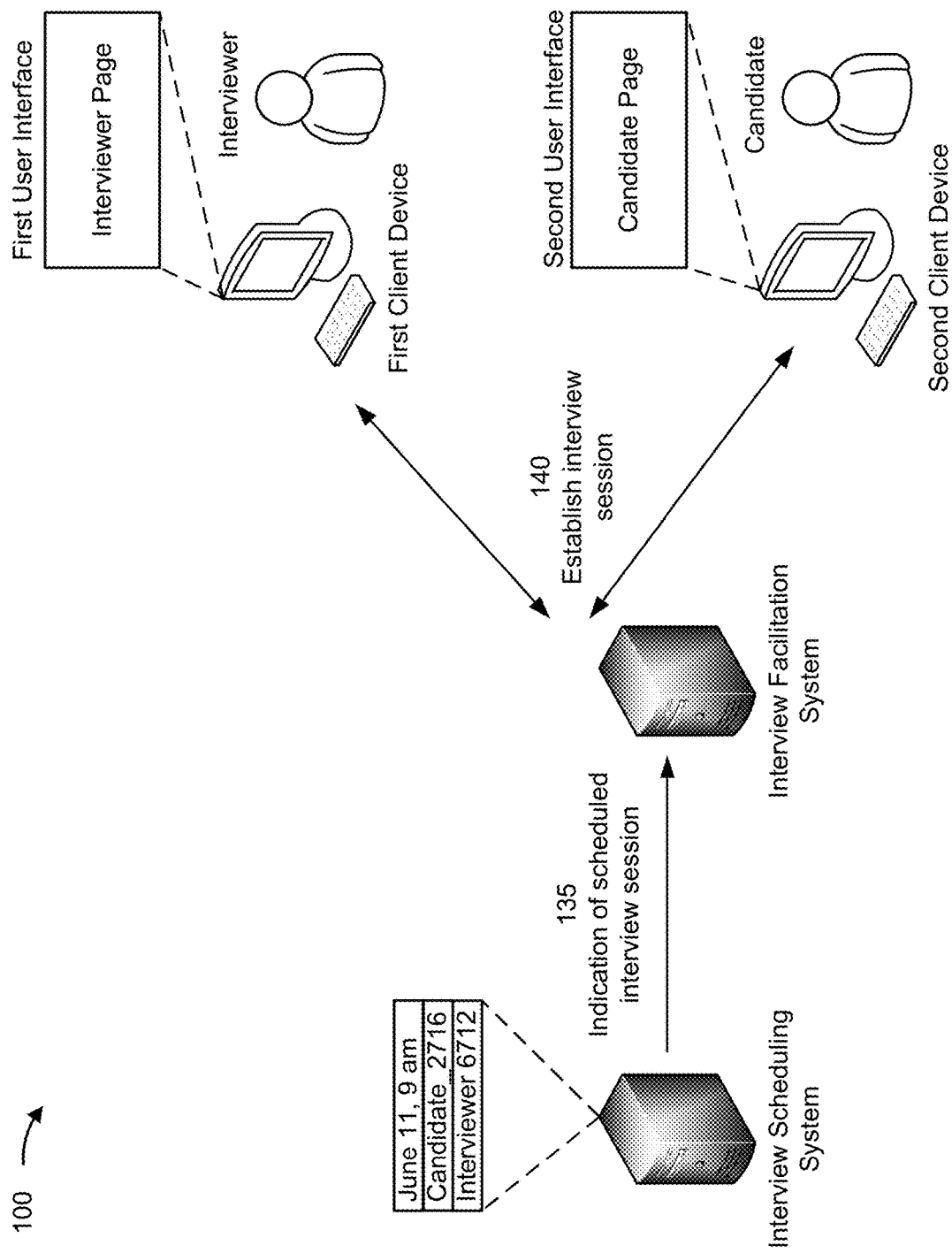

As shown in FIG. 1C, and by reference number 135, the interview scheduling system may transmit, to the interview facilitation system, an indication of the interview scheduled between the interviewer and the candidate. The interview may be scheduled based on the interviewer profile associated with the interviewer indicating that the interviewer is certified to conduct the type of interview associated with the interview. In other words, the indication of the interview may be based on a validation that the interviewer is certified to conduct the interview. The indication of the interview may indicate an identity of the interviewer, an identity of the candidate, an interview day and time, the position for which the candidate is applying, and/or the type of interview.

As shown by reference number 140, the interview facilitation system may establish an interview session between a first client device associated with the interviewer and a second client device associated with the candidate. The interview session may be an electronic session established between the first client device and the second client device for conducting the interview between the interviewer and the candidate. The interview session may be a video session, an audio session, and/or a text based session. The interview session may involve a first user interface for the first client device. The first user interface may be associated with an interviewer page. The interview session may also involve a second user interface for the second client device. The second user interface may be associated with a candidate page.

Figure 1D:
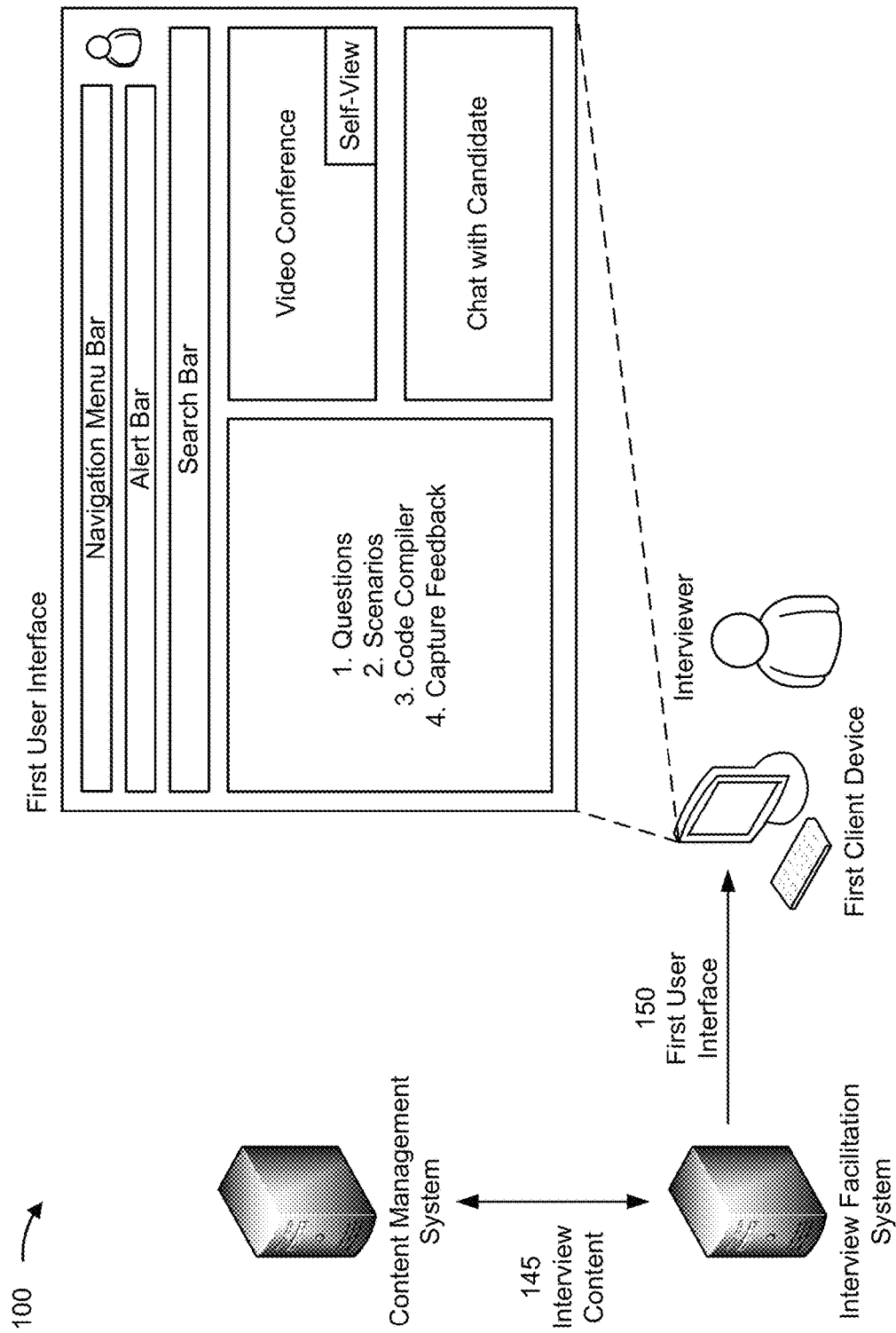

As shown in FIG. 1D, and by reference number 145, the interview facilitation system may receive interview content from the content management system. The interview facilitation system may receive the interview content during the interview session established between the first client device and the second client device. The interview content may include interview questions and scenarios and may be based on the position for which the candidate is applying.

In some implementations, the interview content received from the content management system may be tailored to the position associated with the interview and the candidate involved in the interview. A difficulty level associated with the interview questions and scenarios, and types of interview questions and scenarios, may be standardized across a plurality of interviews for a same position irrespective of interviewers conducting the plurality of interviews. The interview questions and scenarios may differ from previous interview questions and scenarios posed to the candidate during an earlier interview.

In some implementations, the interview content received from the content management system may be updateable in real time based on organization requirements and interviewing requirements. The interview content may be curated for the interviewer based on the position for which the candidate is applying. The interview content may include assessment guides, interview guides, and/or scorecards, which may be created and delivered from the content management system to the interview facilitation system in real time during the interview session. The interview facilitation system may forward the interview content to the first client device during the interview session.

As shown by reference number 150, the interviewer facilitation system may transmit, to the first client device associated with the interviewer, the first user interface during the interview session between the first client device and the second client device. The first user interface may provide a video stream of the candidate, a chat box for messaging between the interviewer and the candidate, and a window for displaying the interview content (e.g., questions and scenarios) and capturing feedback associated with the interview. The window may enable the candidate to provide feedback during the interview session regarding the interview and/or the candidate involved in the interview. The first user interface may also provide a navigation menu bar, an alert bar (e.g., to provide alerts related to fraud detection), and/or a search bar to enable searching for interview content.

In some implementations, the first user interface may provide a window associated with a code compiler. For example, during the interview session, the candidate may write code and submit the code via the second client device. The code may be compiled, and the interviewer may be able to assess the compiled code to evaluate a competency of the candidate.

In some implementations, the interviewer facilitation system may detect, during the interview session, that the candidate involved in the interview session is potentially associated with fraudulent activity. The interviewer facilitation system may detect that the candidate is potentially associated with fraudulent activity based on voice recognition and/or face recognition. For example, the interviewer facilitation system may have access to past recordings, images, etc. associated with the candidate that were obtained during an interview process. The interviewer facilitation system may use voice recognition, image recognition, and other techniques against the video stream of the candidate to determine when a person in the video is not the candidate that is applying for the position. The interviewer facilitation system may transmit, to the first client device associated with an interviewer, an alert for display via the first user interface indicating that the candidate is potentially associated with the fraudulent activity.

In some implementations, the interviewer facilitation system may be able to detect potentially fraudulent activity using machine learning and/or artificial intelligence techniques. The interviewer facilitation system may detect the potentially fraudulent activity via voice recognition to ensure that the candidate interviewing for the position is a correct candidate. The interviewer facilitation system may detect the potentially fraudulent activity via face and screen monitoring. The interviewer facilitation system may use voice and/or image data to detect the potentially fraudulent activity. The interviewer facilitation system may obtain data from recruiting and background verification systems to detect untruthful statements and/or misleading statements made by the candidate during the interview session.

Figure 1E:
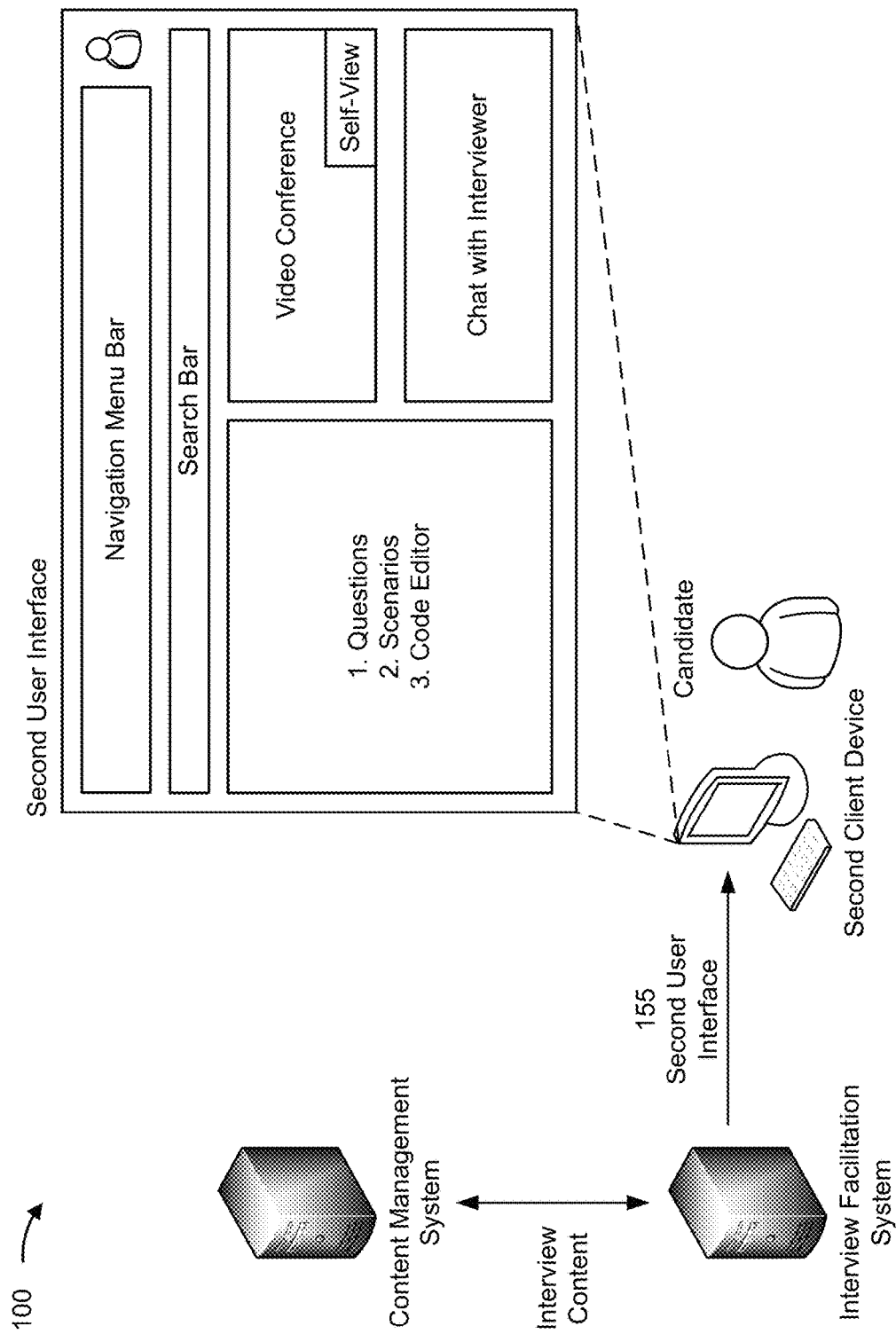

As shown in FIG. 1E, and by reference number 155, the interviewer facilitation system may transmit, to the second client device associated with the candidate, the second user interface during the interview session between the first client device and the second client device. The second user interface may provide a video stream of the interviewer, the chat box for messaging between the interviewer and the candidate, and a window for displaying the interview content. The second user interface may provide a navigation menu bar, and/or a search bar to enable searching for interview content. The second user interface may provide a window associated with a code editor. For example, during the interview session, the candidate may write code and submit the code via the code editor. The code may be compiled, and the interviewer may be able to assess the compiled code to evaluate the competency of the candidate.

Figure 1F:
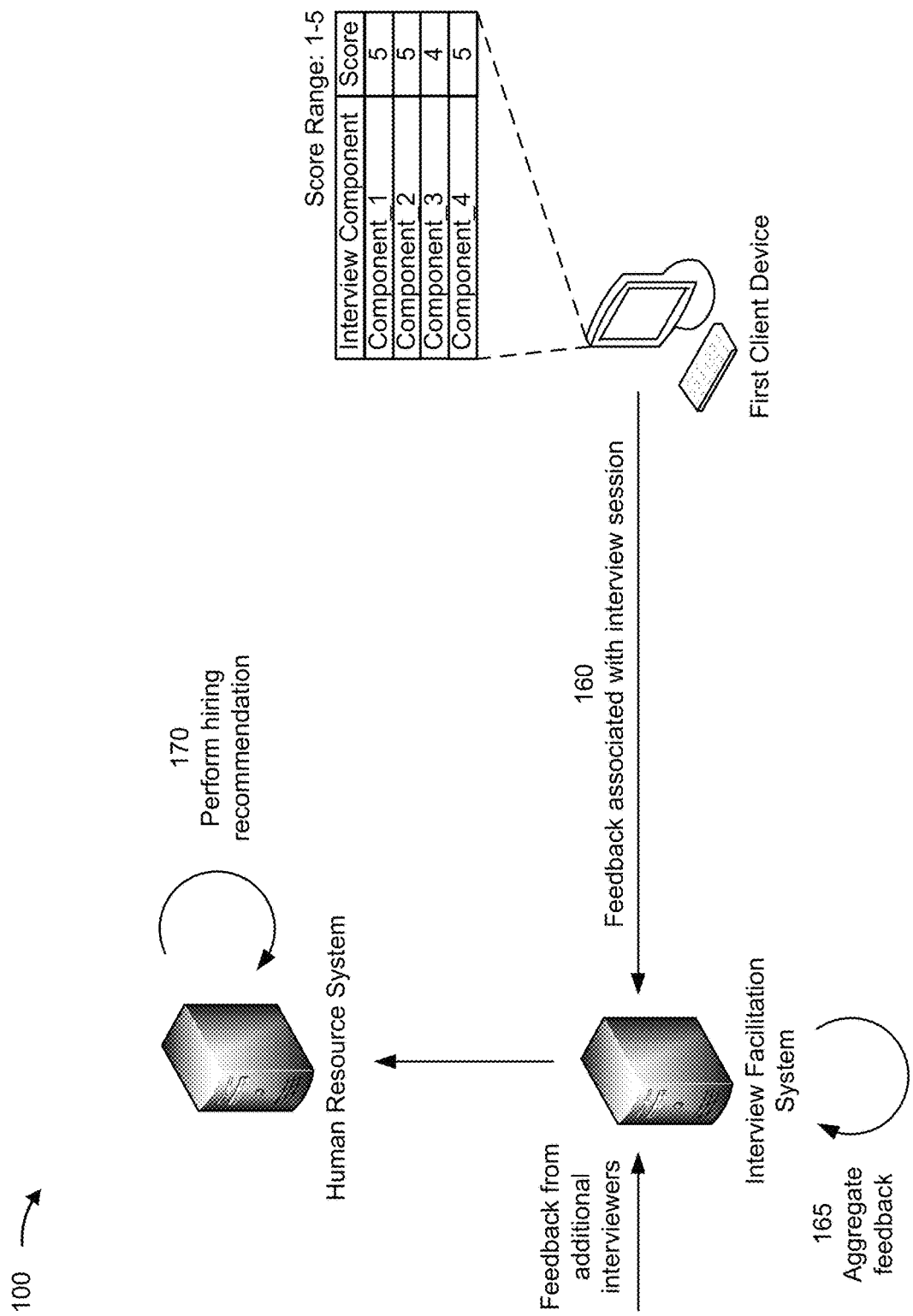

As shown in FIG. 1F, and by reference number 160, the interviewer facilitation system may receive, from the first client device associated with the interviewer, the feedback associated with the interview session. The feedback may be grouped into various interview components, and each interview component may be associated with a score (e.g., a numerical value ranging from 1 to 5, where 1 is an unfavorable score and 5 is a favorable score). The feedback may include notes captured by the interviewer via the first client device during the interview session. In some implementations, the interviewer facilitation system may receive additional feedback from additional interview sessions involving the candidate. For example, the candidate may interview with additional interviewers during the additional interview sessions, and each interviewer may submit feedback regarding the candidate.

As shown by reference number 165, the interviewer facilitation system may aggregate the feedback with the additional feedback to form aggregated feedback. The additional feedback may be received from additional client devices associated with the additional interviewers. The additional feedback may be associated with the additional interview sessions conducted by the additional interviewers with the candidate for the same position. The interviewer facilitation system may transmit the aggregated feedback to the human resource system.

As shown by reference number 170, the human resource system may perform a hiring recommendation based on the aggregated feedback. The hiring recommendation may involve determining whether to offer the position associated with the interview to the candidate. The hiring recommendation may consider the aggregated feedback from the interview(s) when performing the hiring recommendation. The human resource system may consider other factors, such as references, writing samples, transcripts, etc., when performing the hiring recommendation.

In some implementations, the interview facilitation system may improve an interviewer experience in terms of conducting interviews and submitting feedback. The interview facilitation system may strengthen interview measurement and assessment quality. The interview facilitation system may provide risk mitigation, as the interview facilitation system may improve a risk position by documenting interview feedback and justification for hiring decisions. The interview facilitation system may provide distinct user personas and application dashboards, which may provide a curated experience based on role type and responsibilities. The user personas may include an interviewer, a recruiter, a hiring manager, an administrator, and/or a content manager.

The interview facilitation system may provide assessments that are less biased due to consistent rating scales, platform controls, and/or in-tool reminders. The interview facilitation system may capture interview feedback using an interviewer feedback capture tool. The interview facilitation system may standardize interview rating scales, interview questions, and interview guides.

In some implementations, the interview facilitation system may streamline rating scales, which may provide simplicity and consistency when measuring candidate performance. The interview facilitation system may provide simplified documentation requirements to improve an interviewer experience. The interview facilitation system may enable consensus management that mitigates bias and improves selection defensibility.

In some implementations, the content management system may maintain and update interview content. The content management system may enable updates to interview and platform content in response to ongoing business needs and interviewing requirements. The content management system may provide real-time creation and delivery of interview guides and scorecards via extract, transform, load (En) and application programming interface (API) processing from custom-designed database and scheduling integration. The content management system may provide customizable guide and assessment components built to serve a wide variety of interview content and assessment needs.

In some implementations, the learning management system, the interviewer profile system, the human resource system, the interviewer scheduling system, the interviewer facilitation system, and/or the content management system may provide interview experience analytics, which may involve automated tracking of interview results and performance. The interview experience analytics may be associated with candidate information, interview feedback and results, interview logistic dashboards, interviewer analytics, and/or audit and legal retrieval. The interview experience analytics may be related to candidate searches and position matching, pass rates, interviewer performance, and/or funnel metrics. The interview experience analytics may be associated with interview pass rates and interviewer effectiveness across a number of organization and demographic dimensions.

In some implementations, separate portals may be available for candidates, interviewers, and/or administrators. In some implementations, a candidate portal may follow a candidate from initial exploration through hiring and disposition, and may be integrated with background check process and provisioning. The candidate portal may include a navigation menu bar, a search bar, applications associated with the candidate, suggested positions for the candidate, a video introduction associated with the candidate, messages from recruiters, post-offer and/or pre-hiring tasks, benefits, and/or information about organization culture. The applications associated with the candidate may include a list of applications, and for each application, possible tasks that may be performed (e.g., schedule interview, start interview, reschedule interview, and/or withdraw application). The suggested positions for the candidate may include a list of suggested positions, and an option to apply for each of the suggested positions. In some implementations, an interviewer portal may provide interviewer training and certification, and participation and interview administration. In some implementations, an administrator portal may allow for analytics on funnel metrics and interview/interviewer performance, which may include candidate searches and position matching, pass rates, adverse impacts, and/or selection fairness.

Figure 1G:
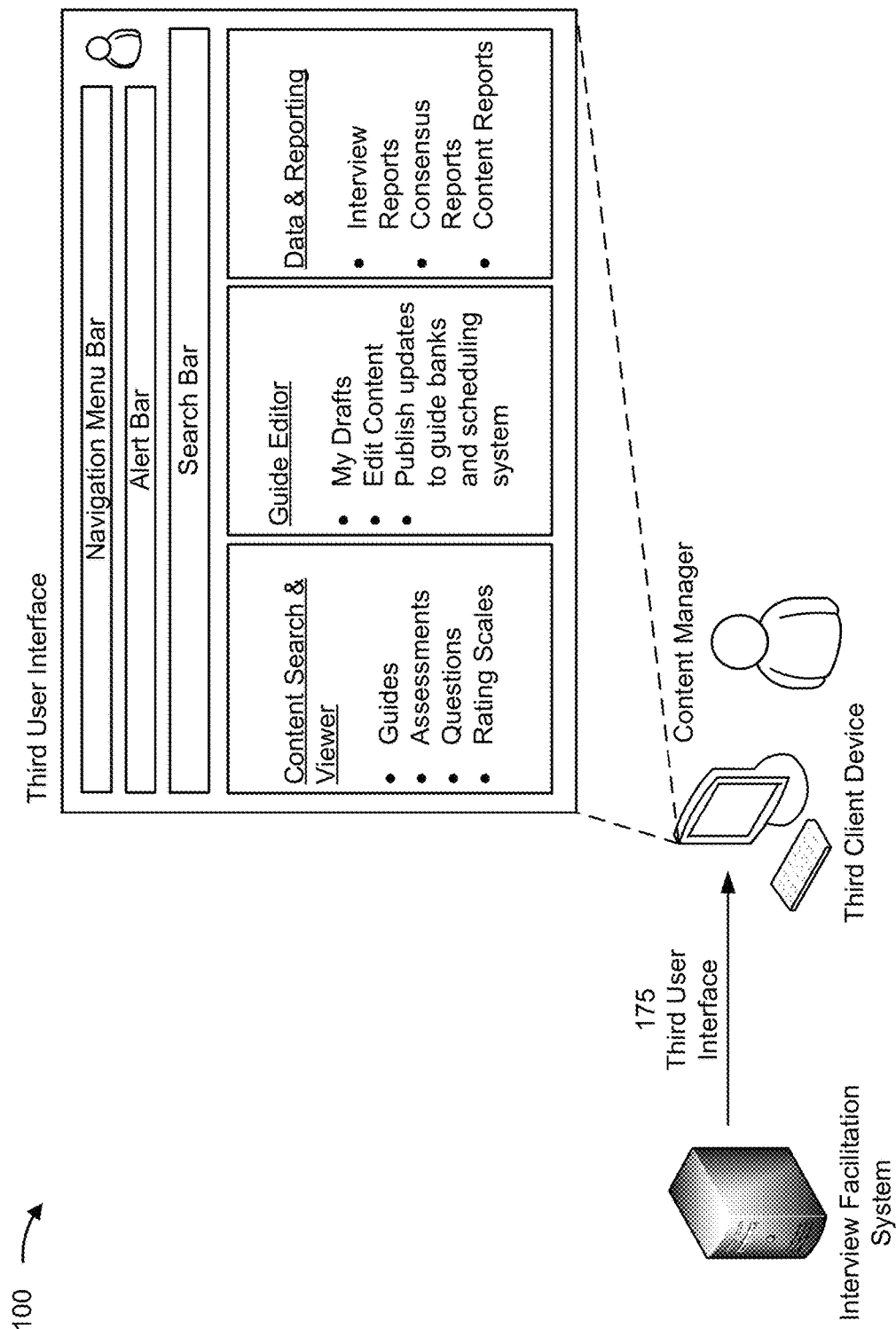

As shown in FIG. 1G, and by reference number 175, the interviewer facilitation system may transmit, to a third client device associated with a content manager, a third user interface. The third user interface may include a navigation menu bar, an alert bar, and/or a search bar. The third user interface may include a section related to a content search and viewer, which may provide guides, assessments, questions, and/or rating scales. The third user interface may include a section related to a guide editor, which may allow the content manager to access drafts, edit content, and/or publish updates to guide banks and to the interview scheduling system. The third user interface may include a section related to data and reporting, which may include interview reports, consensus reports, and/or content reports.

Figure 1H:
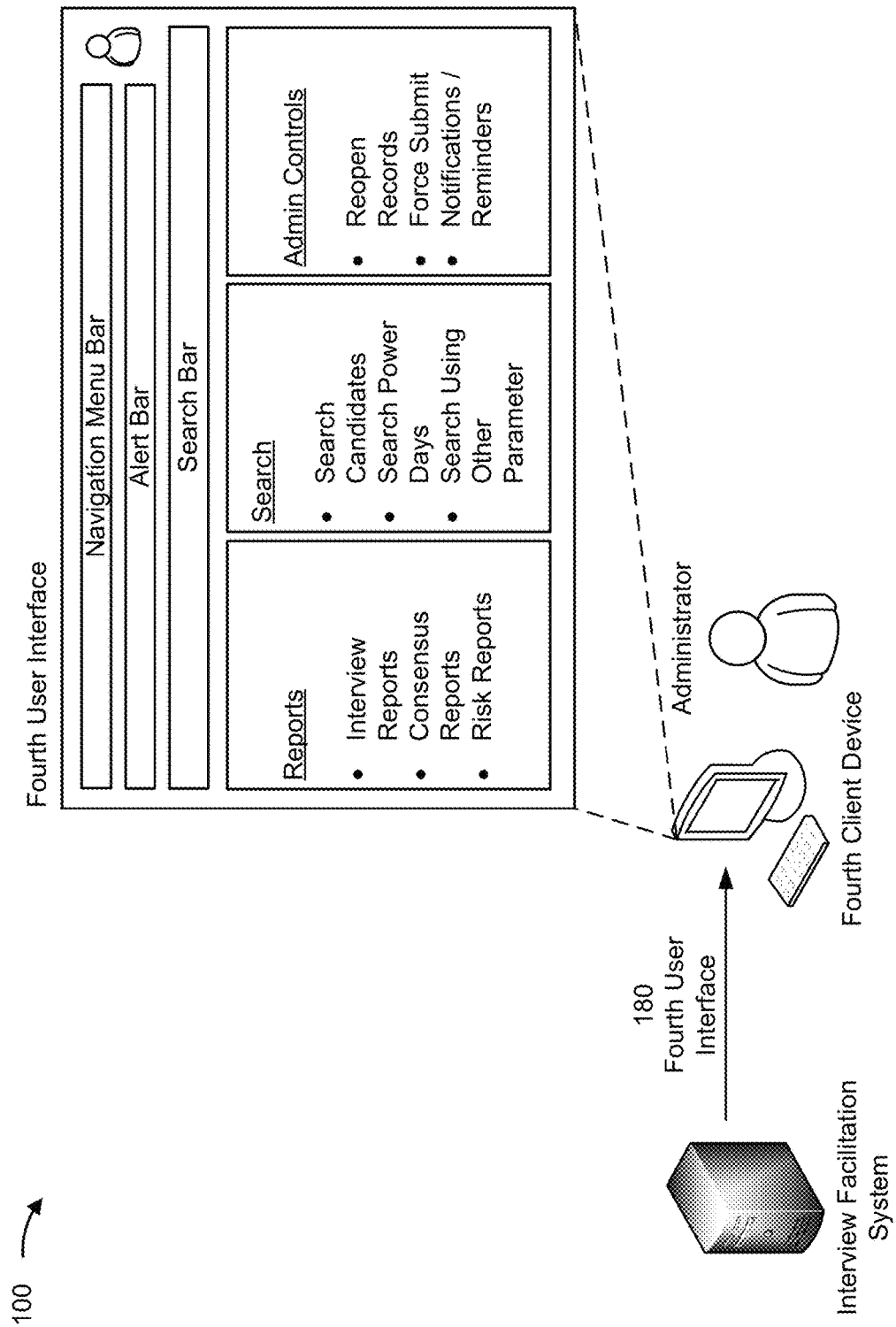

As shown in FIG. 1H, and by reference number 180, the interviewer facilitation system may transmit, to a fourth client device associated with an administrator, a fourth user interface. The fourth user interface may include a navigation menu bar, an alert bar, and/or a search bar. The fourth user interface may include a section related to reports, which may include interview reports, consensus reports, and/or risk reports. The fourth user interface may include a section related to searching, which may allow the administrator to search candidates, search power days, and/or search using other parameters. The fourth user interface may include a section related to administrator controls, which may allow the administrator to reopen records, force a submit, and/or send notifications/reminders.

Figure 1I:
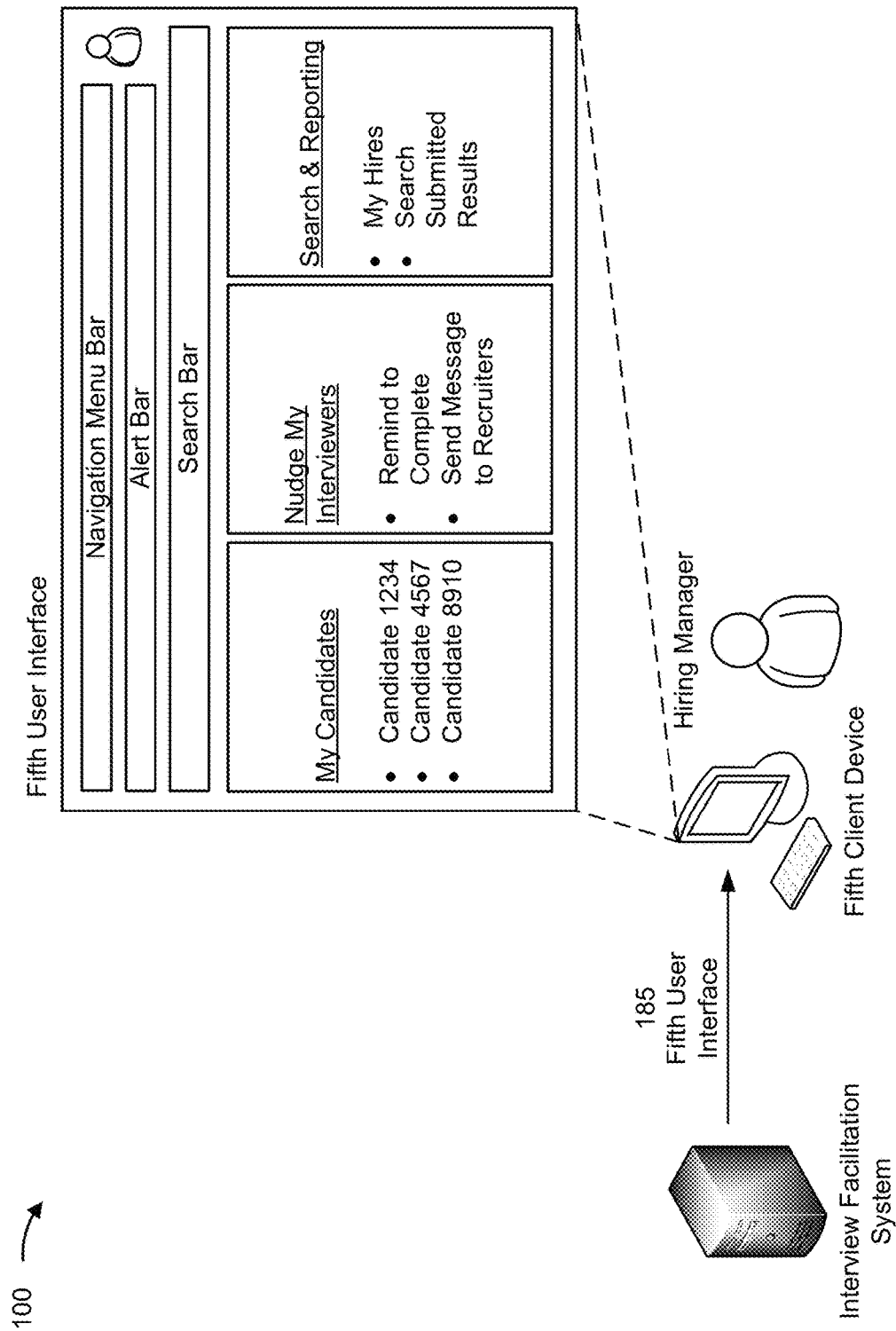

As shown in FIG. 1I, and by reference number 185, the interviewer facilitation system may transmit, to a fifth client device associated with a hiring manager, a fifth user interface. The fifth user interface may include a navigation menu bar, an alert bar, and/or a search bar. The fifth user interface may include a section related to candidates, which may include a listing of specific candidate numbers. The fifth user interface may include a section related to nudging interviewers, which may allow the hiring manager to send a reminder to the interviewers to complete tasks, and/or send a message to recruiters. The fifth user interface may include a section related to search and reporting, which may allow the hiring manager to access hires and/or search submitted results.

Figure 1J:
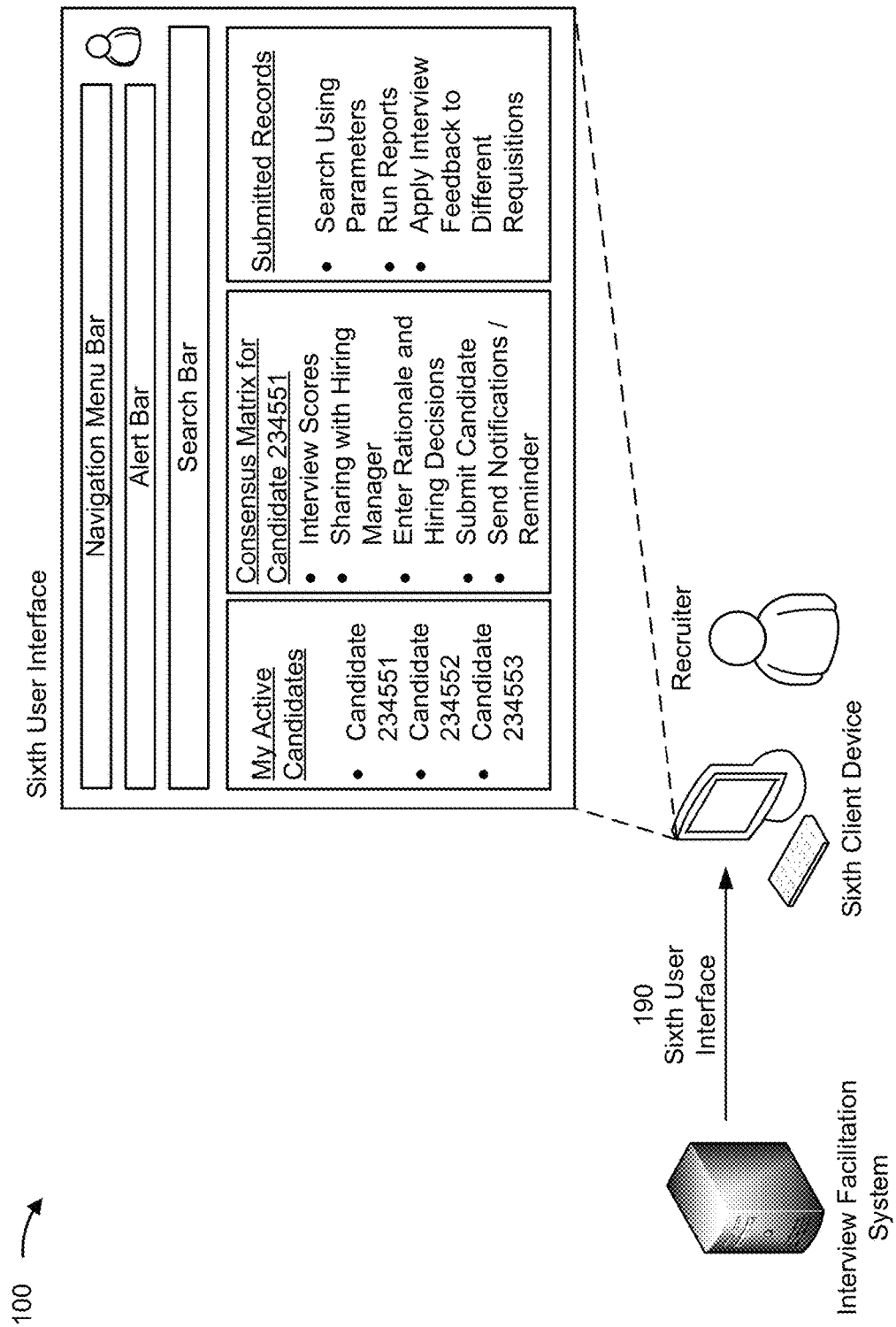

As shown in FIG. 1J, and by reference number 190, the interviewer facilitation system may transmit, to a sixth client device associated with a recruiter, a sixth user interface. The sixth user interface may include a navigation menu bar, an alert bar, and/or a search bar. The sixth user interface may include a section related to active candidates, which may include a listing of identification numbers associated with the active candidates. The sixth user interface may include a section related to a consensus matrix for a specific candidate, which may allow the recruiter to access interview scores, share the interview scores with a hiring manager, enter a rational and hiring decision, submit a candidate, and/or send notifications or reminders. The sixth user interface may include a section related to submitted records, which may allow the recruiter to search using various parameters, run reports, and/or apply interview feedback to different requisitions.

Figure 1K:
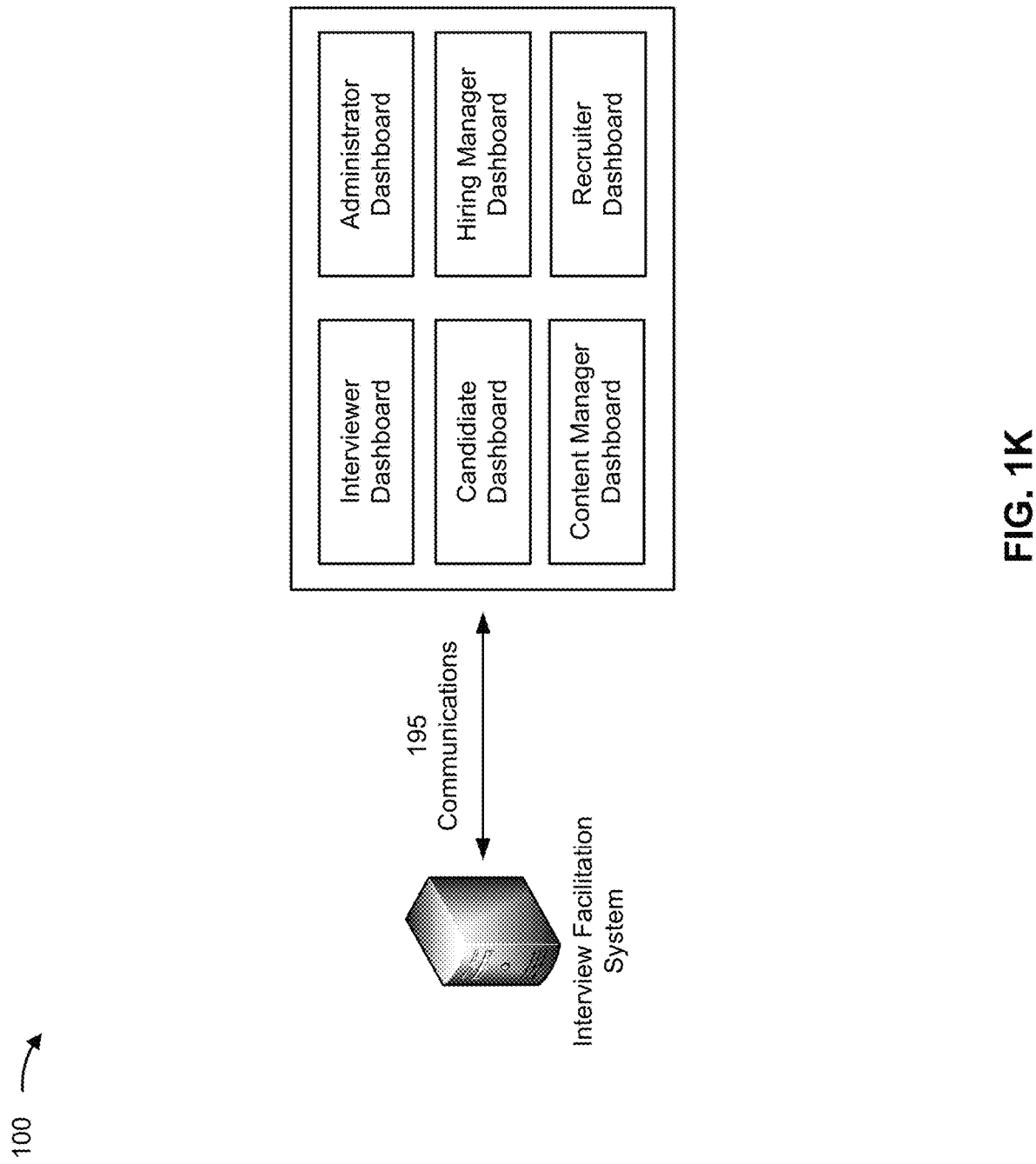

As shown in FIG. 1K, and by reference number 190, the interviewer facilitation system may communicate with various dashboards, including an interviewer dashboard associated with the first user interface, a candidate dashboard associated with the second user interface, a content manager dashboard associated with the third user interface, an administrator dashboard associated with the fourth user interface, a hiring manager dashboard associated with the fifth user interface, and/or a recruiter dashboard associated with the sixth user interface. Further, the interviewer dashboard, the candidate dashboard, the content manager dashboard, the administrator dashboard, the hiring manager dashboard, and/or the recruiter dashboard may communicate with each other and/or the interviewer facilitation system prior to interview sessions, during the interview sessions, and/or after the interview sessions.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
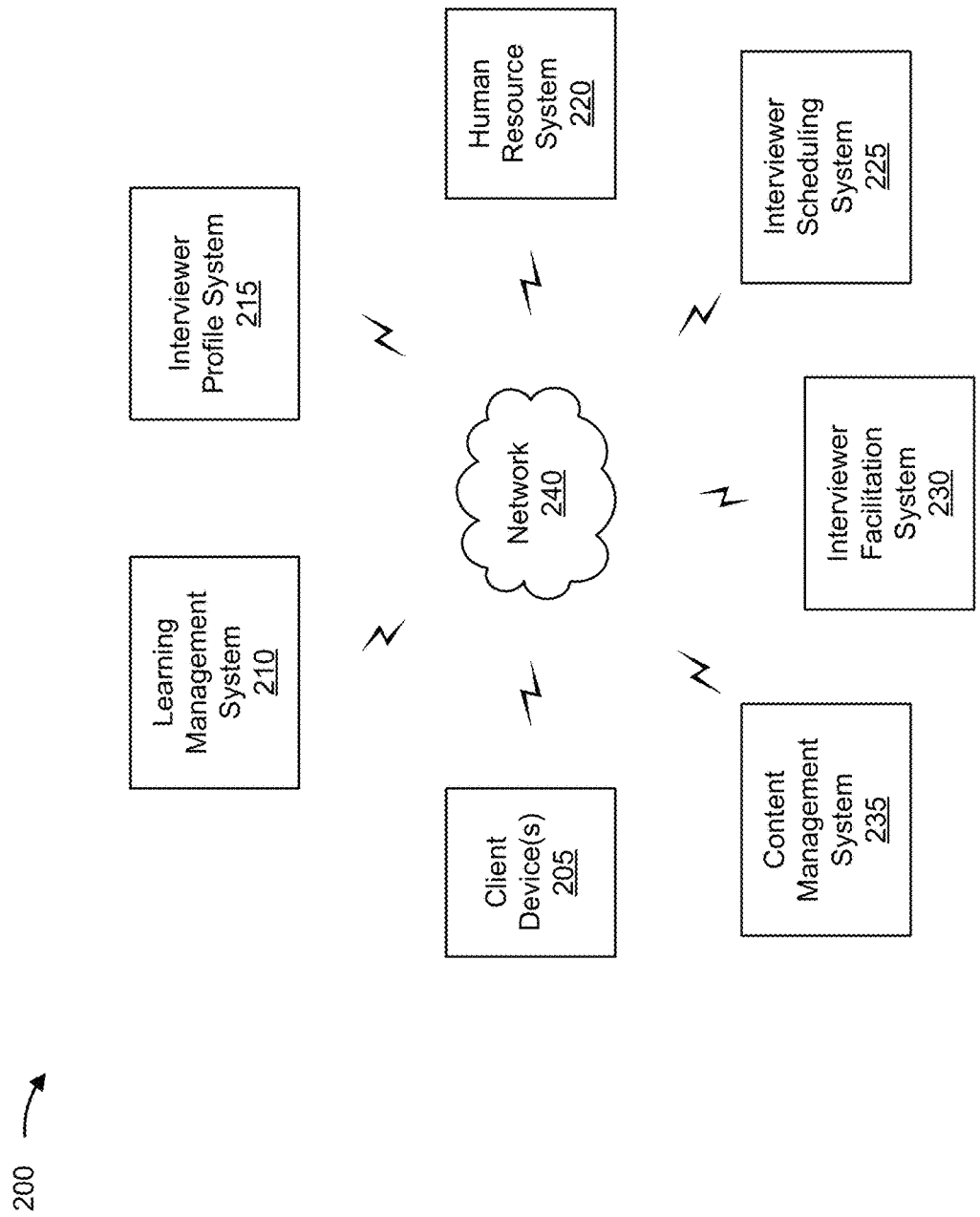
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 205, a learning management system 210, an interviewer profile system 215, a human resource system 220, an interviewer scheduling system 225, an interviewer facilitation system 230, a content management system 235, and a network 240. Devices of environment 200 may interconnect via wired connections, wireless connections, or a combination of wired and wireless connections.

The client device 205 includes one or more devices capable of receiving, generating, storing, processing, and/or providing information associated with providing an interface for interview sessions, as described elsewhere herein. The client device 205 may include a communication device and/or a computing device. For example, the client device 205 may include a wireless communication device, a phone such as a smart phone, a mobile phone or a video phone, a user equipment, a laptop computer, a tablet computer, a desktop computer, or a similar type of device. In some implementations, the client device 205 may be used to connect to each of a plurality of virtual sessions associated with the aggregated virtual session.

The learning management system 210 includes one or more devices capable of receiving, generating, storing, processing, providing, and/or routing information associated with providing access to courses, as described elsewhere herein. The learning management system 210 may include a communication device and/or a computing device. For example, the learning management system 210 may include a server, such as an application server, a client server, a web server, a database server, a host server, a proxy server, a virtual server (e.g., executing on computing hardware), or a server in a cloud computing system. In some implementations, the learning management system 210 includes computing hardware used in a cloud computing environment.

The interviewer profile system 215 includes one or more devices capable of receiving, generating, storing, processing, providing, and/or routing information associated with providing an interface for interview sessions, as described elsewhere herein. The interviewer profile system 215 may include a communication device and/or a computing device.

For example, the interviewer profile system 215 may include a server, such as an application server, a client server, a web server, a database server, a host server, a proxy server, a virtual server (e.g., executing on computing hardware), or a server in a cloud computing system. In some implementations, the interviewer profile system 215 includes computing hardware used in a cloud computing environment.

The human resource system 220 includes one or more devices capable of receiving, generating, storing, processing, providing, and/or routing information associated with providing an interface for interview sessions, as described elsewhere herein. The human resource system 220 may include a communication device and/or a computing device. For example, the human resource system 220 may include a server, such as an application server, a client server, a web server, a database server, a host server, a proxy server, a virtual server (e.g., executing on computing hardware), or a server in a cloud computing system. In some implementations, the human resource system 220 includes computing hardware used in a cloud computing environment.

The interviewer scheduling system 225 includes one or more devices capable of receiving, generating, storing, processing, providing, and/or routing information associated with providing an interface for interview sessions, as described elsewhere herein. The interviewer scheduling system 225 may include a communication device and/or a computing device. For example, the interviewer scheduling system 225 may include a server, such as an application server, a client server, a web server, a database server, a host server, a proxy server, a virtual server (e.g., executing on computing hardware), or a server in a cloud computing system. In some implementations, the interviewer scheduling system 225 includes computing hardware used in a cloud computing environment.

The interviewer facilitation system 230 includes one or more devices capable of receiving, generating, storing, processing, providing, and/or routing information associated with providing an interface for interview sessions, as described elsewhere herein. The interviewer facilitation system 230 may include a communication device and/or a computing device. For example, the interviewer facilitation system 230 may include a server, such as an application server, a client server, a web server, a database server, a host server, a proxy server, a virtual server (e.g., executing on computing hardware), or a server in a cloud computing system. In some implementations, the interviewer facilitation system 230 includes computing hardware used in a cloud computing environment.

The content management system 235 includes one or more devices capable of receiving, generating, storing, processing, providing, and/or routing information associated with providing interview content, as described elsewhere herein. The content management system 235 may include a communication device and/or a computing device. For example, the content management system 235 may include a server, such as an application server, a client server, a web server, a database server, a host server, a proxy server, a virtual server (e.g., executing on computing hardware), or a server in a cloud computing system. In some implementations, the content management system 235 includes computing hardware used in a cloud computing environment.

The network 240 includes one or more wired and/or wireless networks. For example, the network 240 may include a cellular network, a public land mobile network, a local area network, a wide area network, a metropolitan area network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
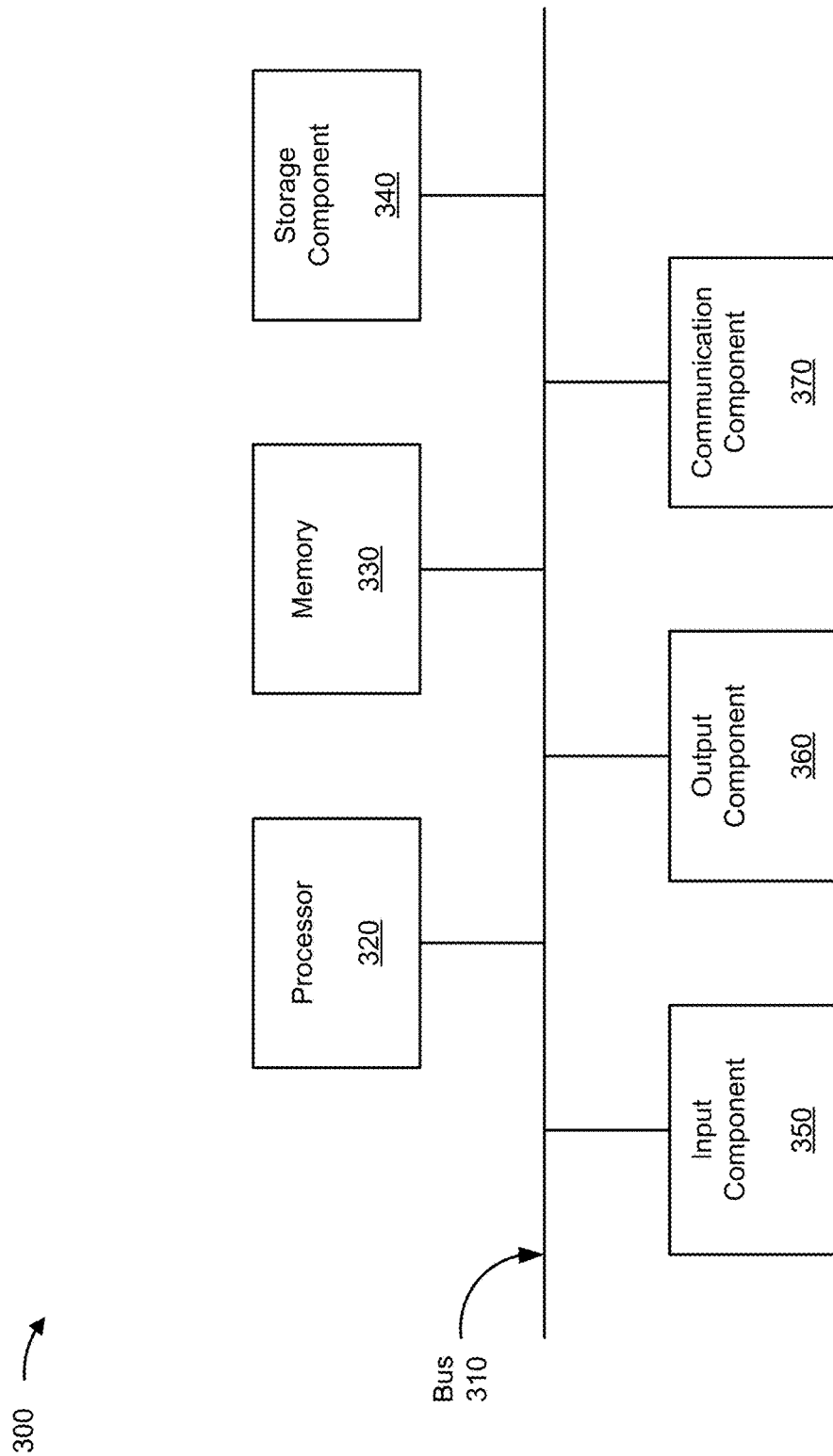
FIG. 3 is a diagram of example components of one or more devices of FIG. 2.

FIG. 3 is a diagram of example components of a device 300, which may correspond to the client device 205, the learning management system 210, the interviewer profile system 215, the human resource system 220, the interviewer scheduling system 225, the interviewer facilitation system 230, and/or the content management system 235. In some implementations, the client device 205, the learning management system 210, the interviewer profile system 215, the human resource system 220, the interviewer scheduling system 225, the interviewer facilitation system 230, and/or the content management system 235 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340)

may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
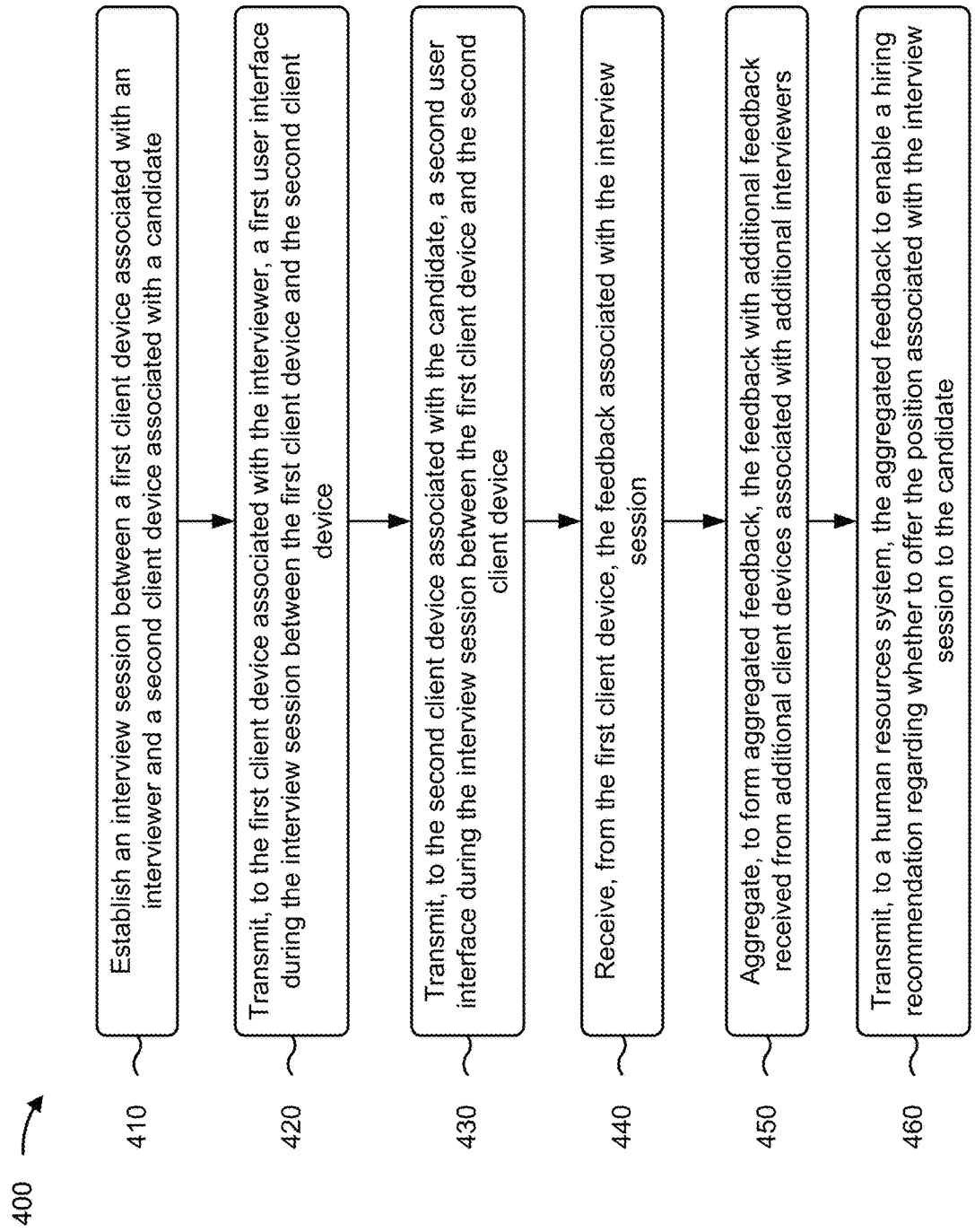
FIG. 4 is a flowchart of an example process relating to providing an interface for interview sessions.

FIG. 4 is a flowchart of an example process 400 associated with providing an interface for interview sessions. In some implementations, one or more process blocks of FIG. 4 may be performed by a system (e.g., client device 205, learning management system 210, interviewer profile system 215, human resource system 220, interviewer scheduling system 225, interviewer facilitation system 230, and/or content management system 235). In some implementations, one or more process blocks of FIG. 4 may be performed by another device or a group of devices separate from or including the system, such as client device 205, learning management system 210, interviewer profile system 215, human resource system 220, interviewer scheduling system 225, interviewer facilitation system 230, and/or content management system 235. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include establishing an interview session between a first client device associated with an interviewer and a second client device associated with a candidate (block 410). The interview session may be established based on an indication received from an interview scheduling system. The interview session may be scheduled based on an interviewer profile associated with the interviewer indicating that the interviewer is certified to conduct a type of interview associated with the interview session. As further shown in FIG. 4, process 400 may include transmitting, to the first client device associated with the interviewer, a first user interface during the interview session between the first client device and the second client device (block 420). The first user interface may provide a video stream of the candidate, a chat box for messaging between the interviewer and the candidate, and a window for displaying interview content and capturing feedback associated with the interview.

As further shown in FIG. 4, process 400 may include transmitting, to the second client device associated with the candidate, a second user interface during the interview session between the first client device and the second client device (block 430). The second user interface may provide a video stream of the interviewer, the chat box for messaging between the interviewer and the candidate, and a window for displaying the interview content. As further shown in FIG. 4, process 400 may include receiving, from the first client device, the feedback associated with the interview session (block 440). As further shown in FIG. 4, process 400 may include aggregating, to form aggregated feedback, the feedback with additional feedback received from additional client devices associated with additional interviewers (block 450). The additional feedback may be associated with additional interview sessions conducted by the additional interviewers with the candidate for a same position. As further shown in FIG. 4, process 400 may include transmitting, to a human resource system, the aggregated feedback to enable a hiring recommendation regarding whether to offer the position associated with the interview session to the candidate (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing an interface for interview sessions, the system comprising:
   one or more memories; and
   one or more processors, communicatively coupled to the one or more memories, configured to:
      receive, from an interview scheduling system, an indication of an interview session scheduled between an interviewer and a candidate, wherein the interview session is scheduled based on an interviewer profile associated with the interviewer indicating that the interviewer is certified to conduct a type of interview associated with the interview session;
      establish the interview session between a first client device associated with the interviewer and a second client device associated with the candidate, wherein the interview session is an electronic session established between the first client device and the second client device for conducting an interview between the interviewer and the candidate;
      receive, from a content management system, interview content associated with the interview session, wherein the interview content includes interview questions and scenarios and is based on a position associated with the interview session;
      transmit, to the first client device associated with the interviewer, a first user interface during the interview session between the first client device and the second client device, wherein the first user interface provides a video stream of the candidate, a chat box for messaging between the interviewer and the candidate, a window for displaying the interview content and capturing feedback associated with the interview during the interview session, and a search bar to enable searching for additional interview content to display via the window, the additional interview content including interview content created in real time during the interview session in accordance with the position associated with the interview session;
      transmit, to the second client device associated with the candidate, a second user interface during the interview session between the first client device and the second client device, wherein the second user interface provides a video stream of the interviewer, the chat box for messaging between the interviewer and the candidate, and a window for displaying the interview content;
      receive, from the first client device, the feedback associated with the interview session; and
      transmit, to a human resource system, the feedback associated with the interview session to enable a hiring recommendation regarding whether to offer the position associated with the interview session to the candidate.

2. The system of claim 1, wherein the interviewer profile is stored in a database associated with an interviewer profile system that stores a plurality of interviewer profiles, wherein the interviewer profile indicates one or more types of interviews that the interviewer is certified to conduct with candidates, and wherein the interviewer profile indicates a certification earned by the interviewer to conduct the type of interview based on a completion of a course associated with the type of interview.

3. The system of claim 1, wherein the indication of the interview session is based on a validation by the interview scheduling system that the interviewer is certified to conduct the interview session, wherein the interviewer is selected from a plurality of interviewers to conduct the interview session based on a plurality of interviewer profiles associated with the plurality of interviewers and an indicated availability associated with each of the plurality of interviewers.

4. The system of claim 1, wherein the interview content received from the content management system is updateable in real time based on organizational requirements and interviewing requirements, wherein the interview content is curated for the interviewer based on the position associated with the interview session, and wherein the additional interview content includes one or more of assessment guides, interview guides or scorecards which are created and delivered to the first client device in real time during the interview session.

5. The system of claim 1, wherein the interview content including the interview questions and scenarios received from the content management system are tailored to the position associated with the interview session and the candidate involved in the interview session, wherein a difficulty level associated with the interview questions and scenarios and types of interview questions and scenarios are standardized across a plurality of interview sessions for a same position irrespective of interviewers conducting the plurality of interview sessions, and wherein the interview questions and scenarios differ from previous interview questions and scenarios posed to the candidate during an earlier interview session.

6. The system of claim 1, wherein the one or more processors are further configured to:
   detect, during the interview session, that the candidate involved in the interview session is potentially associated with fraudulent activity based on one or more of voice recognition or face recognition; and
   transmit, to the first client device associated with an interviewer, an alert for display via the first user interface indicating that the candidate is potentially associated with the fraudulent activity.

7. The system of claim 1, wherein the one or more processors are further configured to receive additional feedback from additional interview sessions involving the candidate, and wherein the feedback associated with the interview session is aggregated with the additional feedback to enable the hiring recommendation regarding whether to offer the position associated with the interview session to the candidate.

8. A method of providing an interface for interview sessions, comprising:
   establishing an interview session between a first client device associated with an interviewer and a second client device associated with a candidate, wherein the interview session is established based on an indication received from an interview scheduling system, and wherein the interview session is scheduled based on an interviewer profile associated with the interviewer indicating that the interviewer is certified to conduct a type of interview associated with the interview session;

transmitting, to the first client device associated with the interviewer, a first user interface during the interview session between the first client device and the second client device, wherein the first user interface provides a video stream of the candidate, a chat box for messaging between the interviewer and the candidate, and a window for displaying interview content and capturing feedback associated with the interview during the interview session;

transmitting, to the second client device associated with the candidate, a second user interface during the interview session between the first client device and the second client device, wherein the second user interface provides a video stream of the interviewer, the chat box for messaging between the interviewer and the candidate, a window for displaying the interview content, and a search bar to enable searching for additional interview content during the interview session, the additional interview content being created based at least in part on a position associated with the interview session;

receiving, from the first client device, the feedback associated with the interview session;

aggregating, to form aggregated feedback, the feedback with additional feedback received from additional client devices associated with additional interviewers, wherein the additional feedback is associated with additional interview sessions conducted by the additional interviewers with the candidate for a same position; and transmitting, to a human resource system, the aggregated feedback to enable a hiring recommendation regarding whether to offer the position associated with the interview session to the candidate.

9. The method of claim 8, further comprising:
receiving, from a content management system, the interview content associated with the interview session, wherein the interview content includes interview questions and scenarios and is based on a position associated with the interview session.

10. The method of claim 8, wherein the interviewer profile is stored in a database associated with an interviewer profile system that stores a plurality of interviewer profiles, wherein the interviewer profile indicates one or more types of interviews that the interviewer is certified to conduct with candidates, and wherein the interviewer profile indicates a certification earned by the interviewer to conduct the type of interview based on a completion of a course associated with the type of interview.

11. The method of claim 8, wherein the interview session is scheduled between the interviewer and the candidate based on a validation by the interview scheduling system that the interviewer is certified to conduct the interview session, wherein the interviewer is selected from a plurality of interviewers to conduct the interview session based on a plurality of interviewer profiles associated with the plurality of interviewers and an indicated availability associated with each of the plurality of interviewers.

12. The method of claim 8, wherein the interview content is received from a content management system and is updateable in real time based on organizational requirements and interviewing requirements, wherein the interview content is curated for the interviewer based on a position associated with the interview session, and wherein the additional interview content includes one or more of assessment guides, interview guides or scorecards which are created and delivered to the first client device in real time during the interview session.

13. The method of claim 8, wherein the interview content is received from a content management system and is tailored to a position associated with the interview session and the candidate involved in the interview session, wherein a difficulty level associated with interview questions and scenarios is standardized across a plurality of interview sessions for a same position irrespective of interviewers conducting the plurality of interview sessions, and wherein the interview questions and scenarios differ from previous interview questions and scenarios posed to the candidate during an earlier interview session.

14. The method of claim 8, further comprising:
detecting, during the interview session, that the candidate involved in the interview session is potentially associated with fraudulent activity based on one or more of voice recognition or face recognition; and
transmitting, to the first client device associated with an interviewer, an alert for display via the first user interface indicating that the candidate is potentially associated with the fraudulent activity.

15. A non-transitory computer-readable medium storing a set of instructions, the set of instructions comprising:
one or more instructions that, when executed by one or more processors of a device, cause the device to:
receive, from an interview scheduling system, an indication of an interview session scheduled between an interviewer and a candidate, wherein the interview session is scheduled based on an interviewer profile associated with the interviewer indicating that the interviewer is certified to conduct a type of interview associated with the interview session;
establish the interview session between a first client device associated with the interviewer and a second client device associated with the candidate;
receive, from a content management system, interview content associated with the interview session, wherein the interview content includes interview questions and scenarios and is based on a position associated with the interview session;
transmit, to the first client device associated with the interviewer, a first user interface during the interview session between the first client device and the second client device, wherein the first user interface provides a video stream of the candidate, a chat box for messaging between the interviewer and the candidate, a window for displaying the interview content and capturing feedback associated with the interview session during the interview session, and a search bar to enable searching for additional interview content including interview content created in real time based at least in part on the position associated with the interview session; and
transmit, to the second client device associated with the candidate, a second user interface during the interview session between the first client device and the second client device, wherein the second user interface provides a video stream of the interviewer, the chat box for messaging between the interviewer and the candidate, and a window for displaying the interview content.

16. The non-transitory computer-readable medium of claim 15, wherein the interviewer profile is stored in a database associated with an interviewer profile system that stores a plurality of interviewer profiles, wherein the interviewer profile indicates one or more types of interviews that the interviewer is certified to conduct with candidates, and wherein the interviewer profile indicates a certification earned by the interviewer to conduct the type of interview based on a completion of a course associated with the type of interview.

17. The non-transitory computer-readable medium of claim 15, wherein the indication of the interview session scheduled between the interviewer and the candidate is based on a validation by the interview scheduling system that the interviewer is certified to conduct the interview session, wherein the interviewer is selected from a plurality of interviewers to conduct the interview session based on a plurality of interviewer profiles associated with the plurality of interviewers and an indicated availability associated with each of the plurality of interviewers.

18. The non-transitory computer-readable medium of claim 15, wherein the interview content received from the content management system is updateable in real time based on organizational requirements and interviewing requirements, wherein the interview content is curated for the interviewer based on the position associated with the interview session, and wherein the additional interview content includes one or more of assessment guides, interview guides or scorecards which are created and delivered to the first client device in real time during the interview session.

19. The non-transitory computer-readable medium of claim 15, wherein the interview content including the interview questions and scenarios received from the content management system are tailored to the position associated with the interview session and the candidate involved in the interview session, wherein a difficulty level associated with the interview questions and scenarios and types of interview questions and scenarios are standardized across a plurality of interview sessions for a same position irrespective of interviewers conducting the plurality of interview sessions, and wherein the interview questions and scenarios differ from previous interview questions and scenarios posed to the candidate during an earlier interview session.

20. The non-transitory computer-readable medium of claim 15, wherein the one or more instructions, when executed by the one or more processors, further cause the device to:
  detect, during the interview session, that the candidate involved in the interview session is potentially associated with fraudulent activity based on one or more of voice recognition or face recognition; and
  transmit, to the first client device associated with an interviewer, an alert for display via the first user interface indicating that the candidate is potentially associated with the fraudulent activity.

* * * * *